(12) United States Patent
Yong et al.

(10) Patent No.: US 8,472,325 B2
(45) Date of Patent: Jun. 25, 2013

(54) NETWORK AVAILABILITY ENHANCEMENT TECHNIQUE FOR PACKET TRANSPORT NETWORKS

(75) Inventors: Lucy Yong, Tulsa, OK (US); Linda Dunbar, Plano, TX (US); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 590 days.

(21) Appl. No.: 11/769,534

(22) Filed: Jun. 27, 2007

(65) Prior Publication Data

US 2008/0279103 A1 Nov. 13, 2008

Related U.S. Application Data

(60) Provisional application No. 60/917,090, filed on May 10, 2007.

(51) Int. Cl.
*H04L 1/00* (2006.01)
(52) U.S. Cl.
USPC .......................................... 370/237; 370/355
(58) Field of Classification Search
USPC ................. 370/241, 242, 252, 216–228, 230, 370/230.1, 235, 237, 351, 352, 355, 389, 370/395.1, 395.2, 395.21, 464, 465, 229; 709/201, 203, 232, 235, 230
See application file for complete search history.

(56) References Cited

U.S. PATENT DOCUMENTS

| 6,049,528 | A | * | 4/2000 | Hendel et al. ................. 370/235 |
| 6,256,309 | B1 | * | 7/2001 | Daley et al. .............. 370/395.43 |
| 6,778,496 | B1 | | 8/2004 | Meempat et al. |
| 7,082,102 | B1 | * | 7/2006 | Wright ........................... 370/229 |
| 7,197,008 | B1 | * | 3/2007 | Shabtay et al. ............... 370/218 |

(Continued)

FOREIGN PATENT DOCUMENTS

| CN | 1842051 | 10/2006 |
| CN | 1859645 | 11/2006 |
| EP | 1324568 A | 7/2003 |
| WO | 2006108434 A1 | 10/2006 |

OTHER PUBLICATIONS

Foreign communication from a related counterpart application—International Search Report and Written Opinion, PCT/CN2008/070929, Aug. 21, 2008, 6 pages.

(Continued)

*Primary Examiner* — Kwang B Yao
*Assistant Examiner* — Obaidul Huq
(74) *Attorney, Agent, or Firm* — Conley Rose, P.C.; Grant Rodolph; Rayhao Chung

(57) ABSTRACT

A packet communications network that transports a plurality of traffic over a plurality of server transport paths from a source to a destination, the network comprising: using a load distribution method to distribute each instance of traffic to an individual transport path, thereby avoiding reordering at the destination; enabling all the transport paths to carry the traffic; allowing the network to provision a preferred traffic distribution through a policy setting; and redistributing the traffic when a condition on one of the transport paths changes. Also disclosed is a composite transport group component comprising: a processor configured to implement a method comprising: receiving a server trail failure notification message; and performing a dynamic redistribution of traffic over a plurality of server trails, thereby transporting substantially all of the traffic associated with a class of traffic transported over the server trail associated with the server trail failure notification message.

24 Claims, 4 Drawing Sheets

U.S. PATENT DOCUMENTS

| | | | |
|---|---|---|---|
| 7,583,677 B1* | 9/2009 | Ma et al. | 370/395.21 |
| 7,631,096 B1* | 12/2009 | Yeh et al. | 709/235 |
| 2002/0071389 A1* | 6/2002 | Seo | 370/232 |
| 2002/0083174 A1* | 6/2002 | Hayashi et al. | 709/225 |
| 2003/0063560 A1* | 4/2003 | Jenq et al. | 370/216 |
| 2003/0081608 A1* | 5/2003 | Barri et al. | 370/392 |
| 2003/0158965 A1* | 8/2003 | Koester | 709/239 |
| 2004/0010617 A1* | 1/2004 | Akahane et al. | 709/243 |
| 2005/0007954 A1 | 1/2005 | Sreemanthula et al. | |
| 2005/0102414 A1 | 5/2005 | Hares et al. | |
| 2005/0246438 A1* | 11/2005 | Menth | 709/224 |
| 2006/0007937 A1* | 1/2006 | Sharma | 370/395.21 |
| 2006/0013126 A1* | 1/2006 | Yasuoka et al. | 370/217 |
| 2006/0168317 A1* | 7/2006 | Charzinski et al. | 709/238 |
| 2006/0182035 A1* | 8/2006 | Vasseur | 370/238 |
| 2006/0209681 A1* | 9/2006 | Yamamoto | 370/218 |
| 2006/0233175 A1 | 10/2006 | Ge et al. | |
| 2006/0251074 A1 | 11/2006 | Solomon | |
| 2006/0262728 A1* | 11/2006 | Addeo et al. | 370/248 |
| 2007/0064604 A1* | 3/2007 | Chen et al. | 370/230 |
| 2007/0100776 A1* | 5/2007 | Shah et al. | 705/400 |
| 2008/0205272 A1* | 8/2008 | Vasseur et al. | 370/235 |

OTHER PUBLICATIONS

International Telecommunication Union; "MPLS Layer Network Architecture", Telecommunication Standardization Sector of ITU, G.8110/Y.1370; Jan. 2005; 72 pgs.

Dunbar, Linda, et al.; "Faults Propagation and Protection for Connection Oriented Data Paths in Packet Networks"; U.S. Appl. No. 11/554,367, filed Oct. 30, 2006; Specification 29 pgs.; 9 Drawing Sheets (Figs. 1-9).

Foreign Communication from a counterpart application—European patent application No. 08734281.2 dated Oct. 14, 2009. (9 pages).

Foreign communication from a counterpart application, European application 08734281.2, Office Action dated Jan. 25, 2011, 6 pages.

Foreign Communication From a Related Counterpart Application, European Application 08734281.2-2416, European Office Action dated Sep. 21, 2012, 6 pages.

Bitar, N., Ed., et al., "Requirements for Multi-Segment Pseudowire Emulation Edge-to-Edge (PWE3)," draft-ietf-pwe3-ms-pw-requirements-05.txt, Mar. 2007, 26 pages.

Meyer, M., Ed., et al., "MPLS Traffic Engineering Soft Preemption," draft-ietf-mpls-soft-preemption-08.txt, Oct. 2006, 13 pages.

Shimoto, K., et al., "Procedures for Dynamically Signaled Hierarchical Label Switched Paths," draft-ietf-ccamp-lsp-hierarchy-bis-02.txt, Apr. 26, 2007, 21 pages.

"Series G: Transmission Systems and Media, Digital Systems and Networks, Digital Network—General Aspects, Unified Functional Architecture of Transport Networks," ITUT G.800, Sep. 2007, 48 pages.

"Series Y: Global Information Infrastructure, Internet Protocol Aspects and Next Generation Networks, Internet Protocol Aspects—Quality of Service and Network Performance," ITUT Y.1541, Feb. 2006, 50 pages.

"IEEE Standard for Local and Metropolitan Area Networks- Link Aggregation," IEEE Std 802.1AX™, Nov. 3, 2008, 163 pages.

Sklower, K., et al., "The PPP Multillink Protocol," RFC 1717, Nov. 1994, 21 pages.

Bradner, S., et al., "Key Words for Use in RFCs to Indicate Requirements Levels," RFC 2119, Mar. 1997, 3 pages.

Shenker, S., et al., "General Characterization Parameters for Integrated Service Network Elements," RFC 2215, Sep. 1997, 17 pages.

Blake, S., et al., "An Architecture for Differentiated Services," RFC 2475, Dec. 1998, 36 pages.

Malis, A., "PPP Over SONET/SDH," RFC 2615, Jun. 1999, 7 pages.

Apostolopoulos, G., et al., "QoS Routing Mechanisms and OSPF Extensions," RFC 2676, Aug. 1999, 51 pages.

Awduche, D., et al., "Requirements for Traffic Engineering Over MPLS," RFC 2702, Sep. 1999, 29 pages.

Thaler, D., et al., "Multipath Issues in Unicast and Multicast Next-Hop Selection," RFC 2991, Nov. 2000, 9 pages.

Hopps,C., et al., "Analysis of an Equal-Cost Multi-Path Algorithm," RFC 2992, Nov. 2000, 8 pages.

Rosen, E., et al., "Multiprotocol Label Switching Architecture," RFC 3031, Jan. 2001, 57 pages.

Awduche, D., et al., "RSVP-TE: Extensions to RSVP for LSP Tunnels," RFC 3209, Dec. 2001, 57 pages.

Grossman, D., "New Terminology and Clarifications for Diffserv," RFC 3260, Apr. 2002, 10 pages.

Andersson, L., et al., "The Multiprotocol Label Switching (MPLS) Working Group Decision on MPLS Signaling Protocols," RFC 3468, Feb. 2003, 12 pages.

Katz, D., et al., "Traffic Engineering (TE) Extensions to OSPF Version 2," RFC 3630, Sep. 2003, 14 pages.

Nagarajan, A., "Generic Requirements for Provider Provisioned Virtual Private Networks (PPVPN)," RFC 3809, Jun. 2004, 25 pages.

Carugi, M., et al., "Service Requirements for Layer 3 Provider Provisioned Virtual Private Networks (PPVPNs)," RFC 4031, Apr. 2005, 50 pages.

Pan, P.,Ed., et al., "Fast Reroute extensions to RSVP-TE for LSP Tunnels," RFC 4090, May 2005, 38 pages.

LeFaucheur, F., Ed., "Protocol Extensions for Support of Diffserv-Aware MPLS Traffic Engineering," RFC 4124, Jun. 2005, 38 pages.

Kompella, K., et al., "Link Bundling MPLS Traffic Engineering (TE)," RFC 4201, Oct. 2005, 13 pages.

Kompella, K., et al., "Label Switched Paths (LSP) hierarchy With Generalized Multi-Protocol Label Switching (GMPLS) Traffic Engineering (TE)," RFC 4206, Oct. 2005, 14 pages.

Kent, S., et al., "Security Architecture for the Internet Protocol," RFC 4301, Dec. 2005, 102 pages.

Rosen, E., et al., "BGP/MPLS IP Virtual Private Networks (VPNs)," RFC 4364, Feb. 2006, 47 pages.

Bryant, S., et al., "Pseudowire Emulation Edge-to-Edge (PWE3) Control Word for Use Over an MPLS PSN," RFC 4385, Feb. 2006, 12 pages.

Andersson, L., Ed., et al., "Framework for Layer 2 Virtual Private Networks (L2VPNs)," RFC 4664, Sep. 2006, 44 pages.

Augustyn, W., Ed., et al., "Service Requirements for Layer 2 Provider-Provisioned Virtual Private Networks," RFC 4665, Sep. 2006, 33 pages.

Kompella, K., Ed., et al., "Virtual Private LAN Service (VPLS) Using BGP for Auto-Discovery and Signaling," RFC 4761, Jan. 2007, 28 pages.

Lasserre, M., Ed., et al., "Virtual Private LAN Service (VPLS) Using Label Distribution Protocol (LDP) Signaling," RFC 4762, Jan. 2007, 31 pages.

Rekhter, Y., et al., "Use of Provider Edge to Provider Edge (PE-PE) generic Routing Encapsulation (GRE) or IP in BGP/ MPLS IP Virtual Private Networks," RFC 4797, Jan. 2007, 10 pages.

Swallow, G., et al., "Avoiding Equal Cost Multipath Treatment in MPLS Networks," RFC 4928, Jun. 2007, 8 pages.

\* cited by examiner

| Server Trail ID | Status | Available Capacity | Provisioned Capacity | Cost |
|---|---|---|---|---|
| 1 | up | 8 Gbps | 10 Gbps | A |
| 2 | up | 18 Gbps | 20 Gbps | B |
| . | . | . | . | . |
| . | . | . | . | . |
| . | . | . | . | . |
| N | down | 0 Gbps | 15 Gbps | D |

300

| Client ID | Capacity | Service Type | Time |
|-----------|----------|--------------|------|
| CL1 | 1 Gbps | 1 | 1/07 |
| CL2 | 500 Mbps | 1 | 5/07 |
| CL3 | 1 Gbps | 2 | 3/07 |
| CL4 | 200 Mbps | 2 | 2/01 |
| CL5 | 1 Gbps | 1 | 1/07 |
| CL6 | 700 Mbps | 2 | 4/07 |
| CL7 | 800 Mbps | 1 | 3/07 |
| CL8 | 1 Gbps | 2 | 4/07 |
| CL9 | 300 Mbps | 1 | 2/07 |

FIG. 3

NETWORK AVAILABILITY ENHANCEMENT TECHNIQUE FOR PACKET TRANSPORT NETWORKS

CROSS-REFERENCE TO RELATED APPLICATIONS

The present application claims priority to U.S. Provisional Patent Application Ser. No. 60/917,090, filed May 10, 2007 by Yong et al. and entitled "Network Availability Enhancement Technique in Packet Transport Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In today's transport networks, telecommunications data may be transported using time division multiplexing (TDM) or packet forwarding. In TDM, data may be divided into a bit stream that is transferred at a constant bit rate and reassembled at the destination. In contrast, packet-based networks divide the data into frames or packets and transport the frames or packets at various rate. One aspect of transport networks is to tolerate network failures, a characteristic that is often referred to as a network availability enhancement. Such failures may be caused by faults in the physical links of the network or due to hardware or software failures in any of the components of the network. Network availability enhancements can be implemented using several techniques that have been established and standardized for TDM-based transport networks. These techniques generally detect a transport network failure, notify the transport channel end point, and then switch the bit stream to another pre-provisioned or backup channel.

Unfortunately, although the TDM-based enhancement availability techniques can be implemented in packet transport networks (PTNs), they do not take advantage of packet transport characteristics. Thus, an improved network availability enhancement for PTNs that can be implemented in real-time is possible.

SUMMARY

In one embodiment, the disclosure includes a communications network comprising a plurality of server trails from a source to a destination carrying a plurality of client traffic. Such a network may include a component that comprises a processor configured to implement a method comprising receiving a server trail failure notification message, and performing a dynamic redistribution of packets over a plurality of server trails, wherein all of the packets in the failed server trail can be transported over one or more normal server trails. As a result, the server trails can protect each other and improve the network availability.

In another embodiment, the disclosure includes a method comprising maintaining a client profile table comprising data associated with a plurality of client traffic entering a connection-oriented network, maintaining a server trail table comprising data associated with a plurality of server trails that transport the client traffic across the network, monitoring the server trails to determine when a fault occurs, redistributing the client traffic over the server trails when the fault occurs, and updating the server trail table to reflect the fault and redistribution of client traffic.

In a third embodiment, the disclosure includes a communications system comprising a first edge node and a second edge node, a plurality of paths that transport client traffic between the first edge node and the second edge node, one of the paths comprising an aggregated link, wherein upon an occurrence of a partial fault in the path with the aggregated link, one of the edge nodes determines whether a reduced path capacity is unacceptable, and upon determining that the reduced path capacity is unacceptable, at least some of the client traffic from the path with partial fault is transferred to the other paths.

In a fourth embodiment, the disclosure includes a communication network comprising a plurality of server trails comprising different transport capacities and/or different types of transportation. The network may implement a method wherein the server trails are able to protect each other when one or more server trails encounters a failure or a partial failure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is an illustration of one embodiment of a client profile table.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method for improving the availability of packet transport networks (PTNs) to transport client traffic when a path entirely or partially fails. The path may entirely fail when connectivity is lost and client traffic may not be transported over the path at all. The path may partially fail when connectivity is maintained but capacity is reduced. When the path entirely or partially fails between a first end point and a second end point in the network, a failure notification message received at the second end point is forwarded to the first end point through another available path. A local server trail table at the first end point may then be updated to indicate the status of the failed path. All or part of the client traffic transported in the failed path may then be redistributed over other available paths between the two end points. When a failed path is restored between the two end points, the method may update the local server trail table for each end point to indicate that the availability of that path is restored. In an embodiment, the present availability enhancement method is advantageous because it takes advantage of packet transport characteristics and is able to restore client traffic in real time, thereby reducing the possibility of network congestion and packet drop rates as well as providing server trail protection capability compared to previous methods.

Figures 1, 2:
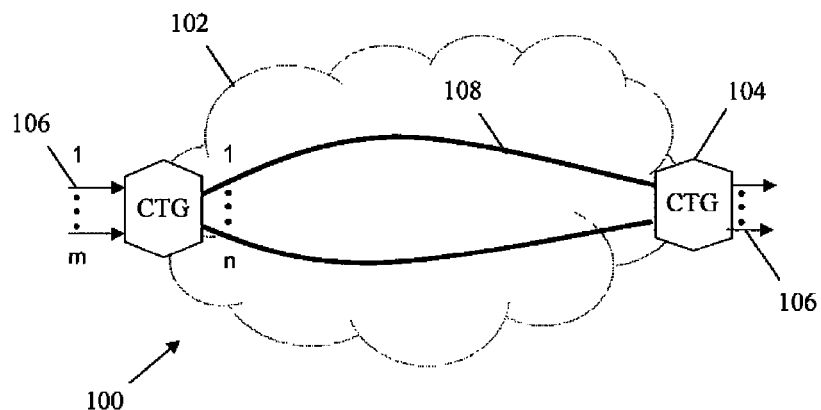
FIG. 1 is an illustration of one embodiment of a packet transport network.
FIG. 2 is an illustration of one embodiment of a server trail table.

FIG. 1 illustrates one embodiment of a system 100 for transporting client traffic from one location to another location. The system 100 comprises a PTN 102, two composite transport group (CTG) components 104, m client connections 106, and n server trails 108, where m is greater than or equal to n. Generally, the two CTGs 104 may exchange information with each other via at least one of the server trails 108 in the PTN 102. As explained in detail below, when one or more server trails 108 fail, a failure notification message is sent through the PTN 102 to the CTG 104. The CTG 104 may redirect client traffic from the failed server trails to one or a plurality of available server trails 108.

In an embodiment, the CTG 104 is functionality built into a network node. Specifically, the CTG 104 may be any device, component, or network that may produce, transport, and/or receive client traffic, for instance, from client connections 106 or from other external nodes. The CTG 104 may reside on a packet transport nodes such as a multi-protocol label switching (MPLS) network, an Institute of Electrical and Electronic Engineers (IEEE) 802 provider backbone bridged-traffic engineered (PBB-TE) network, or a connection-oriented wireless network, or resides on customer premise equipment (CPE) such as packet voice PBX, video service platform, and Web server. The CTGs 104 may send and/or receive client traffic, or merely pass the received client traffic onto a provider network or any other network. The CTGs 104 may be either a source or a destination as those terms are used herein.

In an embodiment, the PTN 102 is any communication system that may be used to transport the client traffic between any two CTGs 104. Specifically, the PTN 102 may be any network within which capacity per a connection path may be reserved. In an embodiment, the PTN 102 may include another PTN that transports client traffic between the two CTGs 104. In another embodiment, the PTN 102 could be a connection oriented Ethernet or MPLS transport network that transports client traffic between the two CTGs 104. For example, the packet transport network 102 may transfer client traffic between an access node and a core node, Digital Subscriber Line Access Multiplexers (DSLAMs) and packet voice gateways or edge routers, Radio Network based systems and Controllers (RNCs), and/or Internet Protocol/MPLS (IP/MPLS) networks. Alternatively, the PTN 102 may be any other type of packet-based transport network known to persons of ordinary skill in the art.

In an embodiment, the client connections 106 are devices, networks, or connections that transport client traffic between external networks and the CTGs 104. For example, each client connection 106 may be associated with one or more customers. The external networks may be a backbone network, an access network, an optical network, a wire-line network, such as a Digital Subscriber Line (DSL), an IEEE 802 network, a wireless network, such as a cellular network, or any other type of networks known to persons of ordinary skill in the art. The client connections 106 may be physical, virtual, and/or wireless connections of different types and may have different transport rates for delivering the client traffic to the CTGs 104 in the PTN 102.

In an embodiment, the server trails 108 are connection paths across networks that transport client traffic between CTGs 104. Similar to client connections 106, the server trails 108 may be physical, virtual, and/or wireless connections that traverse at least part of the PTN 102 and on which bandwidth is reserved. The individual server trails 108 may be different types and have varied bandwidths. Moreover, the individual server trails 108 may also be different types and have bandwidths different from the client connections 106. Each of the server trails 108 may connect a single port on the source CTG 104 with a single port on the destination CTG 104. Between the two CTGs 104, the server trails 108 may comprise a plurality of nodes, such as routers or switches, and a plurality of links, such as wires or fiber optics. The nodes and links may have different properties, such as physical structure, capacity, transmission speed, and so forth. In some embodiments, the links may comprise an aggregated link such as IEEE 802.3ad. For example, the link between two routers may be a fiber optic bundle that contains a plurality of individual fiber optic lines.

The client traffic in the PTN 102 may be defined as client data that is transported from a source to a destination. Specifically, the client traffic may be transported between two CTGs 104 in the PTN 102, or two CTGs 104 outside of the PTN 102. Examples of client traffic include frames or packets, such as Ethernet frames, IP packets, ATM cells, and any similar information structure. The client traffic may contain an identifier that associates the packet or frame with a distinct connection. In embodiments, the identifier may include client traffic source and destination address, a type protocol identifier (TPID) and/or a virtual local area network identifier (VLAN ID) as defined in IEEE 802.1Q, but is not limited to such.

FIG. 2 illustrates an embodiment of a server trail table 200. The server trail table 200 may be a record that identifies each existing server trail that may comprise one direct link or a plurality of links that connect two edge nodes in a network. For each server trail, the table entries may comprise a server trail identifier 202, a status 204, an available capacity 206, a provisioned capacity 208, and a cost 210. The server trail table 200 may also contain any other information that may be used for tracking network failures and recovery. The server trail identifier 202 may be a number or identifier that is uniquely assigned to each individual server trail in the network. The status 204 may be either set to "up" to indicate whether the server trail is available at some capacity and in service, or set to "down" to indicate that the server trail is out of service. Alternatively, the status 204 may indicate the extent to which a server trail is up or down. The provisioned capacity 208 represents a reserved capacity for individual server trail, which may differ from one trail to another. The available transport capacity 206 represents the capacity that the server trail is able to transport, which could be less than or equal to its provisioned capacity at a given time due to the trail condition changes such as a partial fault. The server trail provisioned capacity may be set equal to zero when there is not any capacity reserved on the server trail. The trail cost 210 may indicate the cost of using the server trail, and may be used to order or arrange priority in distribution and facilitate dynamic redistribution of the client traffic in case of a fault or a shortage in network capacity. The server trail table 200 may be a dynamic entity that can be modified by the CTG, by creating, editing, or deleting its entries according to transport availability status and server trail addition or removal. In an embodiment, when a server trail fails, its status 204 entry is changed by the CTG from "up" to "down" and its available capacity is reduced to zero. The trail status may also be reset from "down" to "up" and its capacity increased when the trail is restored.

FIG. 3 illustrates an embodiment of a client profile table 300. The client profile table 300 may be located at the edge nodes of the transport network and may be used to track failures and perform recovery. For each client connection in the PTN, the client profile table 300 entries may comprise a client identifier 302 that is uniquely assigned to the individual client, a capacity entry 304 that specifies the total bandwidth of the client connection, a type entry 306 specifies the service type that the network uses to transport the client traffic, such as low delay or TCP friendly burst, and a time 308 that specifies the starting client traffic transmission time. The capacity entry 304 may be further divided into a confirmed information rate (CIR) that is the guaranteed rate for client traffic, and an extra information rate (EIR) that is an allowed, but not guaranteed rate for client traffic. The client profile table 300 may also contain any other entries, for example, that may be used for optimizing client traffic transport in the PTN and minimizing client traffic loss or bottlenecks. The client profile table 300 in FIG. 3 contains nine client connections with varied capacities that are transported over two server trails between a pair of CTGs on two nodes of the PTN.

Figure 4:
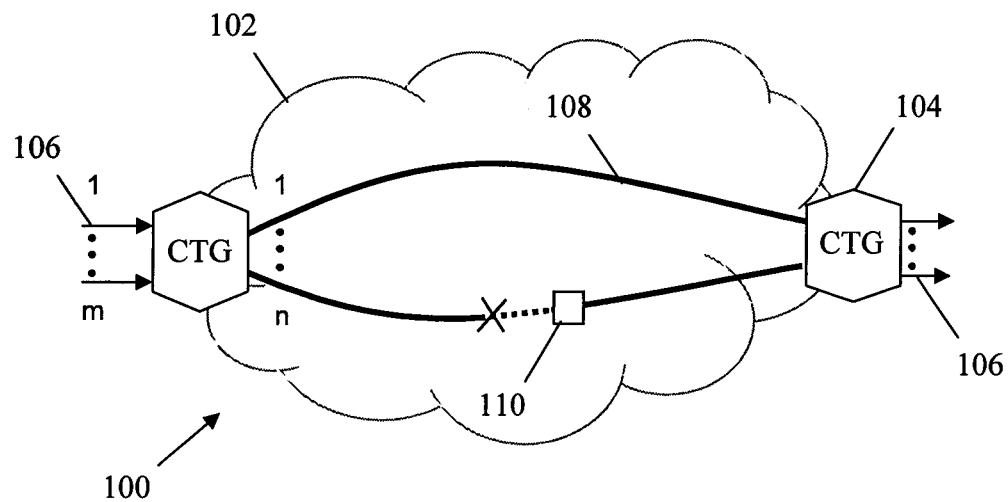
FIG. 4 is an illustration of another embodiment of a packet transport network.

FIG. 4 illustrates one embodiment of PTN 102 where a fault occurs in the nth server trail 108. Upon realizing that a fault has occurred, an internal node 110 adjacent to the failure point on the nth trail may transmit a fault notification (FN) message towards the egress CTG 104. When the egress CTG 104 receives the message, the CTG generates a backward defect indication (BDI) message towards the source CTG node 104 through another available server trail. The FN and BDI messages are described as AIS and RDI messages respectively, in U.S. patent application Ser. No. 11/672,214, filed Feb. 7, 2007 by Yong et al. and entitled "Hierarchical Processing and Propagation of Partial Faults in a Packet Network," which is incorporated herein by reference as if reproduced in its entirety. The CTGs 104 may also use other types of failure notification messages that are known to persons of ordinary skill in the art. When the source CTG 104 receives the BDI message, the CTG 104 makes the necessary changes to the nth trail entries in the server trail table to indicate that the trail is out of service. Upon changing the server trail status, the source CTG 104 may switch all client traffic from the failed nth server trail to one or a plurality of available server trails 108 in real-time or within a few, e.g. less than ten, milliseconds. When the nth server trail is repaired, the source CTG 104 may stop receiving the BDI messages, and the trail may be marked again in service by updating the server trail table. The CTG 104 may then switch back the client traffic to the nth server trail.

In an embodiment, the amount of client traffic that may be switched from the failed server trail is restricted by the available capacity in the remaining server trails of the PTN. For example, a plurality of client connections may be transported between the two CTGs 104 over the plurality of server trails 108 when one of the server trails fails. After receiving a BDI message and updating the server trail table, the source CTG 104 may calculate the total free capacities in the other available server trails 108, e.g. using the client profile table and/or the server trail table. The source CTG 104 may then redistribute the client connections from the failed server trail to one or a plurality of the other server trails 108 based on the client connections with the highest priority. The CTG 104 may also redistribute the client connections from the failed server trail to one or a plurality of the other server trails 108 based on the capacities of the client connections, the client connections with the longest transmission time, the cost of the client connections, or any combination of such criteria or other criteria chosen by a person of ordinary skill in the art. To avoid sequence reordering for each client connection, the CTG distributor function will guarantee that client traffic from one client connection will be transported over a single trail among a plurality of server trails. The CTG 104 may use entries in the server trail table and/or the client profile table as criteria for the redistribution of client connections. When there is no more free capacity in the server trails 108, the source CTG 104 perform selective shutdown client connection to drop some client connections from the remaining client connections that were transported over the failed link and inform the client to stop sending traffic. Selective shutdown can be achieved by blocking or filtering the traffic per a client connection. In another embodiment, some of the client connections on the failed server trail may have higher priorities than some of the client connections on the other available server trails 108. In such a case, the source CTG 104 may shutdown one or a plurality of lower priority client connections on the available server trails 108 to guarantee sufficient capacity for the high priority client connections. The high priority client traffic may then be redistributed from the failed server trail 108 to the available server trails 108.

Figure 5:
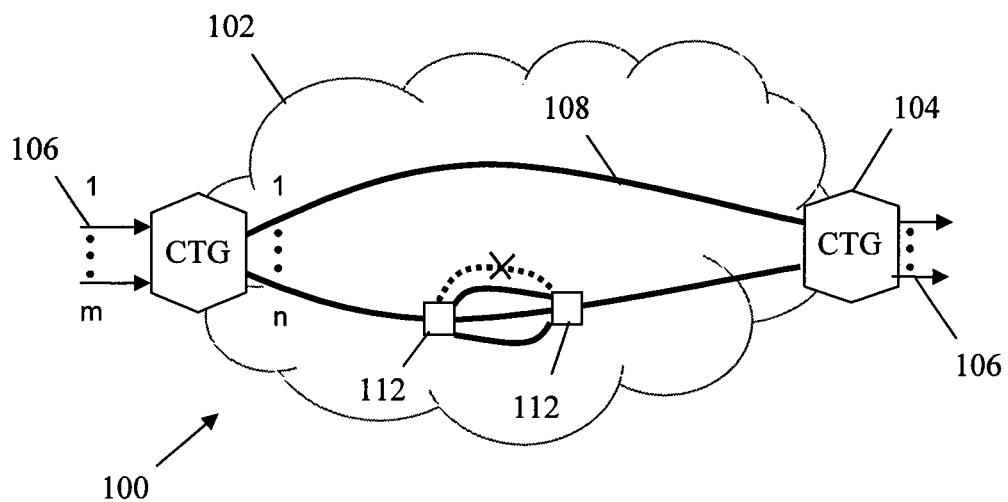
FIG. 5 is an illustration of another embodiment of a packet transport network.

FIG. 5 illustrates an embodiment of PTN 102 in which a partial fault has occurred. A partial fault may exist due to a failed link in an aggregated link, and is described in detail in U.S. patent application Ser. No. 11/554,367, filed Oct. 30, 2006 by Dunbar et al. and entitled "Faults Propagation and Protection for Connection Oriented Data Paths in Packet Networks," which is incorporated by reference as if reproduced in its entirety. Briefly, an aggregated link may be a set of links bundled as a single logical link with a composite link capacity from one internal point to another internal point in the network. A link member in an aggregated link can fail and cause reduction in the composite link capacity, a condition known as a partial failure. When a partial fault occurs in the nth server trail 108 between two internal nodes 112, an FN or forwarding defect indication (FDI) message may be sent from one internal node to the destination CTG node 104. The message may be sent in the case where the aggregated link capacity is not enough to transport the client traffic, for example when the remaining capacity is less than the provisioned capacity or the actual total client traffic rate across an aggregated link, otherwise the client traffic is redistributed over the aggregated link. When the source CTG node 104 receives the FN with the capacity reduction indication, the source CTG node 104 may update the server trail table and change the available capacity of the corresponding trail. Since the server trail is still in service, the source CTG node 104 may continue forwarding the client traffic to the server trail and use its available capacity to determine the distribution of client traffic over other server trails. If necessary, the CTG may redistribute the client traffic over the server trails using the aforementioned distribution criteria and/or techniques. In the partial fault situation, it is possible that multiple partial faults take place on a server trail. When this happens, FN or other types of notification messages may be generated at every failure point. To avoid many FN messages and complications, a message consolidation method can be used to ensure that the FD message received at the CTG node 104 has only the maximum capacity reduction indication.

The CTG technique described herein is distinguishable from the virtual concatenation group (VCG) technique defined in ITU G.707. First and foremost, the CTG uses a packet transport network, while the VCG uses TDM networks. In the VCG technique, several synchronous digital hierarchy (SDH) payload containers are combined into a single payload container for a tributary source and sink, wherein, the individual SDH payloads may traverse different paths. The tributary can use the composite container with a composite container to transfer client traffic. This network architecture resembles that of CTG where multiple server trails connect two edge nodes. For both techniques, individual client traffic may be transported over individual paths in the network. However, the VCG technique includes all sorts of different schemes for delay management, frame alignment, and sequence management. On the other hand, the CTG distribution function is capable of forwarding-based on client connections. Although a server trail may have different delays, the CTG collection function does not need to perform packet alignment and sequence management. This is a significant simplification over the VCG technique. In addition, the CTG allows server trails to have different capacity, which is prohibited in VCG. In addition, CTG may be made aware of client traffic while VCG may be unaware of it. Finally, although VCG improves network resilience, its main function is to form a large container to a tributary for client data. The main function for CTG is however to improve network resilience and provide transport flexibility.

The CTG may also be distinguished from link aggregation group (LAG) as defined in IEEE 802.3ad. While aggregated links may be used in both techniques to transport multiple client links in packet-based networks, no internal nodes, links, or sub-network hierarchies are used in the LAG. The LAG combines multiple Ethernet links into one logical link so that multiple links may be used by Ethernet spanning tree without blocking. The LAG achieves high link availability, increases link capacity, and can be implemented over existing Ethernet hardware. However, unlike CTG, the LAG technique may only be applied to point-to-point links, where MAC switching is not allowed within. Moreover, all the links in LAG must operate at the same data rate. The CTG is similar to the LAG in the sense that multiple client connections are transported over all the server trails (LAG members). The CTG also uses similar distribution constraint as LAG to ensure the single client connection over a single server trail, therefore no alignment and reordering is performed at the destination. However, the LAG is used to prevent link blocking in a spanning tree environment while CTG is not. In fact, CTG is used in connection oriented packet transport networks, where all server trails are predetermined and configured by operators. Unlike to the LAG, the CTG is used at source and destination edge nodes, where trails can cross different routes and individual routes can be switched in a PTN. The CTG also allows different server trails to operate at different data rates. The CTG is mainly used for traffic engineering and providing transport resiliency. In short, the LAG may be described as a link technology while CTG is described as a network technology.

Another packet-based technique that differs from CTG is IP/MPLS. IP/MPLS is a packet-based technique that uses equal cost multiple paths (ECMP) for traffic engineering and improving network availability. In IP/MPLS, a router may distribute the client traffic over multiple next hops of equal cost, and ECMP may allow multiple paths between any two routers. When a failure happens in the network, an open shortest path first (OSPF) protocol may broadcast topology changes to every router in the network where each router may update its link state database and its routing table in order to improve network availability. Updating link state databases and routing tables becomes very dependent on the OSPF routing protocol. As a result, given an arbitrary network topology, it is hard for an operator to manage the number of ECMP and predict a path for an IP flow. In addition, implementing the OSPF protocol requires much longer time in comparison to the CTG performance and traffic recovery time may take seconds. ECMP is often computed based on routing distance and it is very challenging to include the routing cost. Due to these limitations in IP/MPLS, the CTG technique is much better suited for connection oriented transport networks. CTG can apply to MPLS network, i.e. bundle multiple LSPs together as a plurality of server trails and transport a plurality of client connections.

Other techniques such as 1+1 and m:n protection switching methods are used in TDM-based networks. Although such techniques may be used for packet network availability enhancement, they do not utilize packet transport characteristics. Therefore, such techniques cannot perform well in partial fault protection, may not allow traffic redistribution based on client or operator requirements, and do not provide flexibility in engineering the network traffic.

Figure 6:
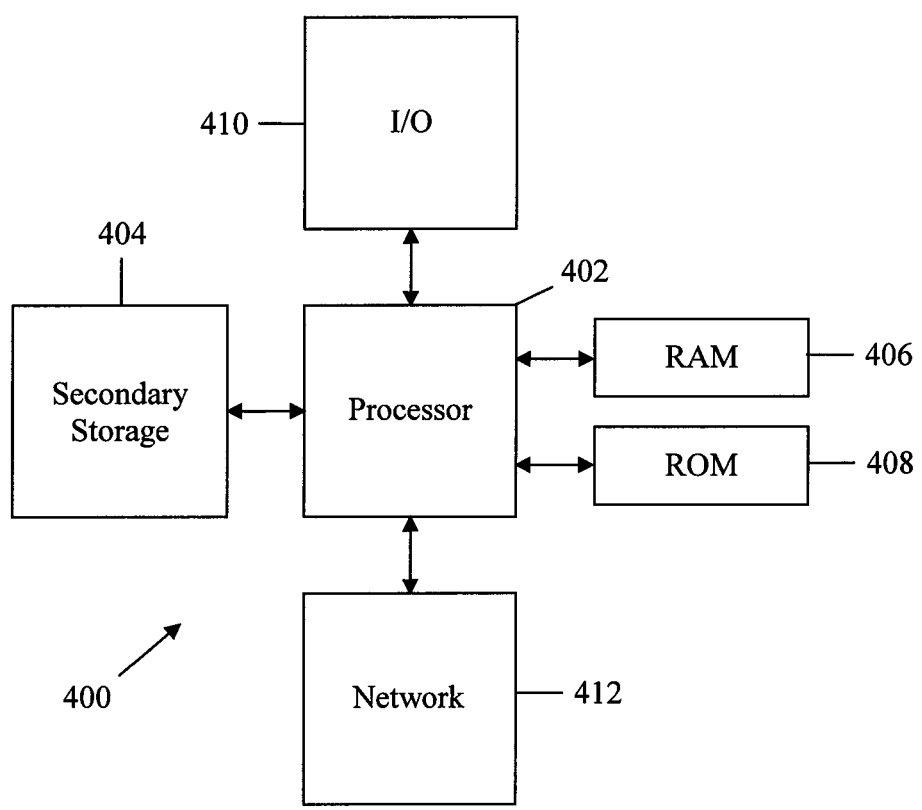
FIG. 6 is one embodiment of a general-purpose network component.

The network described above may be implemented on any general-purpose network component, such as a computer, router, switch, or bridge, with sufficient processing power, memory resources, and network throughput capability to handle the necessary workload placed upon it. FIG. 6 illustrates a typical, general-purpose network component suitable for implementing one or more embodiments of a node disclosed herein. The network component 400 includes a processor 402 (which may be referred to as a central processor unit or CPU) that is in communication with memory devices including secondary storage 404, random access memory (RAM) 406, read only memory (ROM) 408, input/output (I/O) 410 devices, and network connectivity devices 412. The processor may be implemented as one or more CPU chips.

The secondary storage 404 is typically comprised of one or more disk drives or tape drives and is used for non-volatile storage of data and as an over-flow data storage device if RAM 406 is not large enough to hold all working data. Secondary storage 404 may be used to store programs that are loaded into RAM 406 when such programs are selected for execution. The ROM 408 is used to store instructions and perhaps data that are read during program execution. ROM 408 is a non-volatile memory device that typically has a small memory capacity relative to the larger memory capacity of secondary storage. The RAM 406 is used to store volatile data and perhaps to store instructions. Access to both ROM 408 and RAM 406 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A composite transport group (CTG) component comprising:
   a port configured to receive a server trail failure notification message; and
   a processor coupled to the port and configured to:
      responsive to receiving the server trail failure notification message, update a server trail status to out of service in a server trail table when a fault occurs in one of a plurality of server trails to indicate that the server trail is unable to transport client traffic until repaired, wherein the server trails cross a plurality of routes in a network; and
      perform a dynamic path redistribution of client traffic over a plurality of remaining server trails to transport all of the client traffic associated with a class of client traffic transported over the one server trail associated with the server trail failure notification message,
   wherein the plurality of server trails transport the client traffic between the composite transport group component and a common destination,
   wherein the server trail failure notification message is sent by an intermediate node to the common destination before transmission to the composite transport group component, and
   wherein performing the dynamic path redistribution comprises:
      redistributing a first portion of the client traffic from the server trail associated with the server trail failure notification message to another server trail; and
      dropping a remaining portion of the client traffic, wherein the capacity of the other server trail is insufficient to accommodate the remaining portion of the client traffic.

2. The component of claim 1, wherein the server trail table comprises data associated with the server trails, wherein the CTG component is an edge node, and wherein the server trails operate at different data rates.

3. The component of claim 1, wherein a client profile table is used to perform the dynamic path redistribution, and wherein the processor is further configured to switch physical routes of the sever trail associated with the server trail failure notification message and switch media access control (MAC) addresses within the server trail associated with the server trail failure notification message.

4. The component of claim 1, wherein at least one server trail comprises a plurality of nodes and a plurality of links, wherein the client traffic with the highest priority transported by the server trail associated with the server trail failure notification message is redistributed over other server trails when the fault occurs, and wherein no client traffic travels on the server trail associated with the server trail failure notification message.

5. A method comprising:
   maintaining, at an ingress node, a client profile table comprising data associated with a plurality of client traffic entering a connection-oriented network;
   maintaining, at the ingress node, a server trail table comprising data associated with a plurality of server trails that transport the client traffic across the network;
   receiving at an egress node a path failure message from an intermediate node;
   sending the path failure message from the egress node to the ingress node;
   redistributing the client traffic over the server trails when a fault occurs; and
   updating the server trail table to reflect the fault and redistribution of the client traffic,
   wherein the data associated with the plurality of client traffic comprises a client identification, a capacity, a service type, and a transmission start time, and
   wherein the client traffic with a smallest capacity amongst the plurality of client traffic is redistributed over the server trails before any other client traffic when the fault occurs.

6. The method of claim 5, wherein the path failure message is an alarm indication signal message, and wherein the server trail table further comprises an available capacity field that indicates an available bandwidth capacity for each server trail.

7. The method of claim 5, wherein the path failure message is a remote defect indication message, and wherein the server trail table further comprises a provisioned capacity field that indicates a provisioned bandwidth capacity for each server trail.

8. The method of claim 5, wherein the server trail table further comprises a cost field that indicates the cost of using each server trail, and wherein the server trails cross a plurality of routes in a network.

9. The method of claim 5, wherein the client traffic with a longest transmission time amongst the plurality of client traffic is redistributed over the server trails when the fault occurs, wherein the server trail table further comprises a server trail identifier field that uniquely identifies each server trail, a server trail status field that indicates whether each server trail has available bandwidth or whether each server trail is out of service, an available capacity field that indicates the available bandwidth capacity for each server trail, a provisioned capacity field that indicates the provisioned bandwidth capacity for each server trail, and a cost field that indicates the cost of using each server trail.

10. The method of claim 5, wherein at least one server trail comprises a plurality of nodes and a plurality of links, wherein the server trail operate at different data rates.

11. The method of claim 5, wherein the redistribution ensures that the server trails are not overloaded, and wherein the server trails cross a plurality of routes through the network.

12. A communications system comprising:
   a first edge node;
   a second edge node; and
   a plurality of paths that transport connection-oriented traffic between the first edge node and the second edge node, wherein the plurality of paths are grouped as a composite transport group (CTG),
   wherein a first one of the plurality of paths transports a first amount of the connection-oriented traffic, and
   wherein upon an occurrence of a partial path fault along the first path, one or both of the first edge node and the second edge node are configured to:
      determine that the first path's reduced capacity is insufficient to transport the first amount of connection oriented traffic; and
      subsequently transfer at least some, but not all, of the first amount of connection-oriented traffic from the first path to one or more other remaining paths, wherein the first path remains in service after the partial path fault is detected and transports a remaining portion of the first amount of connection-oriented traffic up to the first path's reduced capacity.

13. The system of claim 12, wherein the first amount of connection-oriented traffic corresponds to a provisioned path capacity, and wherein the CTG comprises at least one physical path and at least one virtual path, and wherein the partial path fault reduces the ability to transport traffic for the first path.

14. The system of claim 12, wherein the partial path fault is detected by analyzing packet drop rate for the first path.

15. The system of claim 12, wherein the paths comprise a plurality of path capacity, wherein the path capacity of the paths are not equal, wherein the paths traverse a network comprising a plurality of intermediate nodes and a plurality of physical links, wherein the paths do not cross the same intermediate nodes, and wherein the first intermediate node is configured to switch the physical links and nodes used by the first path.

16. The system of claim 12, wherein a plurality of partial path faults occur along the first path that generate a plurality of partial path fault messages, and wherein the system consolidates the plurality of partial path fault messages into a defect indication message that specifies a single capacity reduction.

17. A packet communications network comprising:
a first composite transport group (CTG) comprising a plurality of server transport paths coupled to a second CTG, wherein the first CTG is configured to:
receive a plurality of connection-oriented client traffic comprising a plurality of client identifiers, wherein a first one of the plurality of connection-oriented client traffic comprises a first one of the client identifiers corresponding to an individual client;
distribute the first one of the plurality of connection-oriented client traffic over a first one of the server transport paths based upon a first entry in a client profile table, wherein the first entry in the client profile table comprises a client identifier field that uniquely identifies each connection-oriented client traffic, a capacity field that indicates the total bandwidth capacity of the connection-oriented client traffic, a service type field that indicates service type of each connection-oriented client traffic, and a starting client traffic transmission time entry field that indicates the starting client traffic transmission time for each connection-oriented client traffic; and
redistribute the first one of the plurality of connection-oriented client traffic to a second one of the server transport paths upon receiving a message indicating that a condition on the first server transport path has changed.

18. The network of claim 17, wherein the first one of the plurality of connection-oriented client traffic is distributed over the first server transport path after the connection-oriented client traffic is received, and
wherein the first one of the plurality of connection-oriented client traffic is redistributed over the second server transport path subsequent to being initially distributed over the first server transport path.

19. The network of claim 17, wherein the first CTG is used to maintain a mapping relationship between the client traffic and the transport paths, and wherein the first CTG is further configured to create server transport paths that cross different physical routes.

20. The network of claim 17, wherein at least some of the server transport paths have different transport capacities, different transport types, or both, and wherein some of the server transport paths have the capability of being diversely routed through the communication network.

21. The network of claim 17, wherein some of the connection-oriented client traffic comprise different types, require different data rates, or both, and wherein at least some of the client traffic is associated with different kinds of service profiles defined by at least one service provider.

22. The network of claim 17, wherein redistributing the connection-oriented client traffic allows at least some of the connection-oriented client traffic to be restored.

23. The packet communications network of claim 17, wherein the capacity field comprises a confirmed information rate (CIR) field and an extra information rate (EIR) field, wherein the CIR field indicates a guaranteed rate for the connection-oriented client traffic, and wherein the EIR field indicates allowed, but not guaranteed, rate for the connection-oriented client traffic.

24. A packet communications network comprising:
a first composite transport group (CTG) comprising a plurality of server transport paths coupled to a second CTG, wherein the first CTG is configured to:
receive a plurality of connection-oriented client traffic comprising a plurality of client identifiers, wherein a first one of the plurality of connection-oriented client traffic comprises a first one of the client identifiers corresponding to an individual client;
distribute the first connection-oriented client traffic over a first one of the server transport paths based upon a first entry in a client profile table; and
redistribute the first connection-oriented client traffic to a second one of the server transport paths upon receiving a message indicating that a condition on the first server transport path has changed,
wherein the first connection-oriented client traffic is distributed over the first server transport path after the connection-oriented client traffic is received, and
wherein the first connection-oriented client traffic is redistributed over the second server transport path subsequent to being initially distributed over the first server transport path,
wherein after distributing the first connection-oriented client traffic, but before redistributing the first connection-oriented client traffic, the first CTG is further configured to:
identify a first entry in a server trail table that is associated with the second server transport path, wherein the first entry specifies a remaining capacity of the second server transport path;
determine that the remaining capacity of the second server transport path is greater than or equal to a required capacity associated with the first connection-oriented client traffic; and
thereafter, select the second server transport path to carry the first connection-oriented client traffic.

* * * * *